(12) United States Patent
Brazas et al.

(10) Patent No.: US 7,040,788 B2
(45) Date of Patent: May 9, 2006

(54) HEADLAMP ADJUSTER

(75) Inventors: Peter B. Brazas, Burbank, IL (US); Michael T. Gattone, Tinley, IL (US)

(73) Assignee: Illinois Tool Works Inc, Glenview, IL (US)

( * ) Notice: Subject to any disclaimer, the term of this patent is extended or adjusted under 35 U.S.C. 154(b) by 72 days.

(21) Appl. No.: 10/833,469

(22) Filed: Apr. 28, 2004

(65) Prior Publication Data

US 2004/0240222 A1 Dec. 2, 2004

Related U.S. Application Data

(60) Provisional application No. 60/474,553, filed on May 30, 2003.

(51) Int. Cl.
*F21V 17/02* (2006.01)

(52) U.S. Cl. ...................... 362/512; 362/273; 362/319; 362/424

(58) Field of Classification Search ................ 362/512, 362/514, 273, 277, 319, 282, 324, 424
See application file for complete search history.

(56) References Cited

U.S. PATENT DOCUMENTS

| | | | | |
|---|---|---|---|---|
| 4,713,739 A | * | 12/1987 | Ryder et al. | 362/424 |
| 5,381,317 A | * | 1/1995 | Schmitt et al. | 362/515 |
| 5,707,133 A | | 1/1998 | Burton | 362/66 |
| 5,741,059 A | * | 4/1998 | Kusagaya | 362/524 |

\* cited by examiner

*Primary Examiner*—Sandra O'Shea
*Assistant Examiner*—Mark Tsidulko
(74) *Attorney, Agent, or Firm*—Paul F. Donovan; Mark W. Croll

(57) ABSTRACT

A headlamp adjuster and a headlamp adjustment assembly have a fixed annular boss, a shaft axially moveable through the boss, and a gear having a thread engagement with a threaded portion of the shaft. A cap is non-rotatably engaged with the shaft and the boss.

5 Claims, 3 Drawing Sheets

HEADLAMP ADJUSTER

CROSS-REFERENCE TO RELATED APPLICATIONS

This Non-Provisional Application claims benefit to U.S. Provisional Application Ser. No. 60/474,553, filed May 30, 2003.

FIELD OF THE INVENTION

The present invention relates to right angle adjustment mechanisms and, more particularly, the invention relates to adjuster mechanisms useful for adjusting the aim of motor vehicle headlights.

BACKGROUND OF THE INVENTION

Vertical and horizontal adjustments of headlamps on motor vehicles are required, for safe and optimal performance. Adjustment is required when the car is assembled. From time-to-time, it is necessary to readjust the aim of vehicle headlamps. If the headlamp is not properly adjusted vertically, the headlamp may focus the light too close to the vehicle, not adequately lighting the distance. If the field of light is too short, objects might not be illuminated soon enough for a driver to react to the presence of the object, even if the vehicle is being operated within legal speed limits. Conversely, if the headlamp is aimed to focus too far in the distance, the area in front of the vehicle may not be properly illuminated for adequate recognition of something in front of the vehicle. Further, a headlamp aimed too distant may "blind" an oncoming driver even in the dimmed or "low-beam" condition.

Horizontal adjusters, although not as common in the modem automobile industry, can be just as important as vertical adjusters. If the headlamp is aimed to direct the beam of light too far to the left, oncoming drivers can be blinded. If focused too far left to the right, the primary field directly in front of the automobile may not be properly illuminated. Improperly directed headlamps can be distracting and unsafe.

Many different adjustment assemblies have been used for automobile headlamps, some used more successfully than others. Known adjustment mechanisms are component style systems having individual components requiring assembly at the time of installation. In one known system, a cold-headed screw is provided with an O-ring and a metal push nut. To assemble the system, the O-ring is pushed onto the shaft of the screw, and the screw and O-ring assembly is positioned through a hole in a panel of a headlamp housing. Thereafter, the push nut is pushed up the screw shaft until it is positioned snuggly against the opposite side of the housing panel, thereby securing the assembly to the panel. A rectangular grommet is placed or snapped into a rectangular hole in a reflector. The screw is threaded into the grommet to establish a preset distance between the headlamp housing panel and reflector. To adjust the position of the reflector, the head of the screw is rotated, typically with a Phillips screwdriver. The reflector is pivotally mounted so as to be able to move in the vertical and/or horizontal plane when the adjuster is utilized. Although adjusters of this type have proven to be useful, because of the many individual components required, labor requirements for assembly and installation are high.

Other known headlamp adjustment assemblies have included housings and shafts that can be pre-assembled. Proper attachment in the headlamp housing can be difficult, requiring the use of tools and difficult or cumbersome alignment within the headlamp housing.

What is needed in the art is an improved headlamp adjuster mechanism that can be snap fit together without the need for tools and without the need for difficult alignment processes.

SUMMARY OF THE INVENTION

The present invention provides a headlamp adjuster that has a base easily attached to or monolithically formed with the headlamp housing. A shaft and cap are snap fit to the base, without the need for alignment and without the need for tools to attach the parts.

In one aspect thereof, the present invention provides a vehicle headlamp adjuster with a fixed base having an annular boss, and a shaft extending through the base. The shaft has an end for engaging a headlamp reflector, a threaded portion and a non-threaded portion. An adjustment gear is disposed rotatably on the shaft and within the annular boss. The adjustment gear defines an axial bore adapted for engagement with the threaded portion of the shaft. A cap is secured to the boss and to the non-threaded portion of the shaft for preventing rotation of the shaft relative to the boss.

In another aspect thereof, the present invention provides a vehicle headlamp assembly with a lamp housing defining a fixed base and a substantially annular boss. A shaft extends through the base, and has an end engaging a headlamp reflector movably retained in the lamp housing. The shaft has a threaded portion. An adjustment gear is disposed rotatably on the shaft and in the annular boss. The gear defines an axial bore adapted to engage the threaded portion of the shaft. A cap has an opening receiving the shaft, and the cap is secured non-rotatably to the shaft and to the boss.

In still another form thereof, the present invention provides a vehicle headlamp adjustment assembly with a lamp housing and a headlamp reflector held movable relative to the lamp housing. The lamp housing defines a fixed base relative to the reflector, the base defining a substantially annular boss. A hole through the base is substantially centered within the annular boss. A shaft extends through the hole in the base and has an end received in a socket of the headlamp reflector. A threaded portion is provided along at least a part of a length of the shaft, and an adjustment gear is disposed rotatably on the shaft and in the annular boss. The gear defines an axial bore adapted to engage the threaded portion of the shaft. A cap has an opening therethrough adapted to be secured non-rotatably to the shaft, and the cap is secured non-rotatably to the boss.

An advantage of the present invention is providing a headlamp adjuster mechanism that requires minimal labor to install in a vehicle.

Another advantage of the present invention is providing a headlamp adjuster that can be made of plastic or other non-corrosive materials.

Other features and advantages of the invention will become apparent to those skilled in the art upon review of the following detailed description, claims and drawings in which like numerals are used to designate like features.

Figure 1:
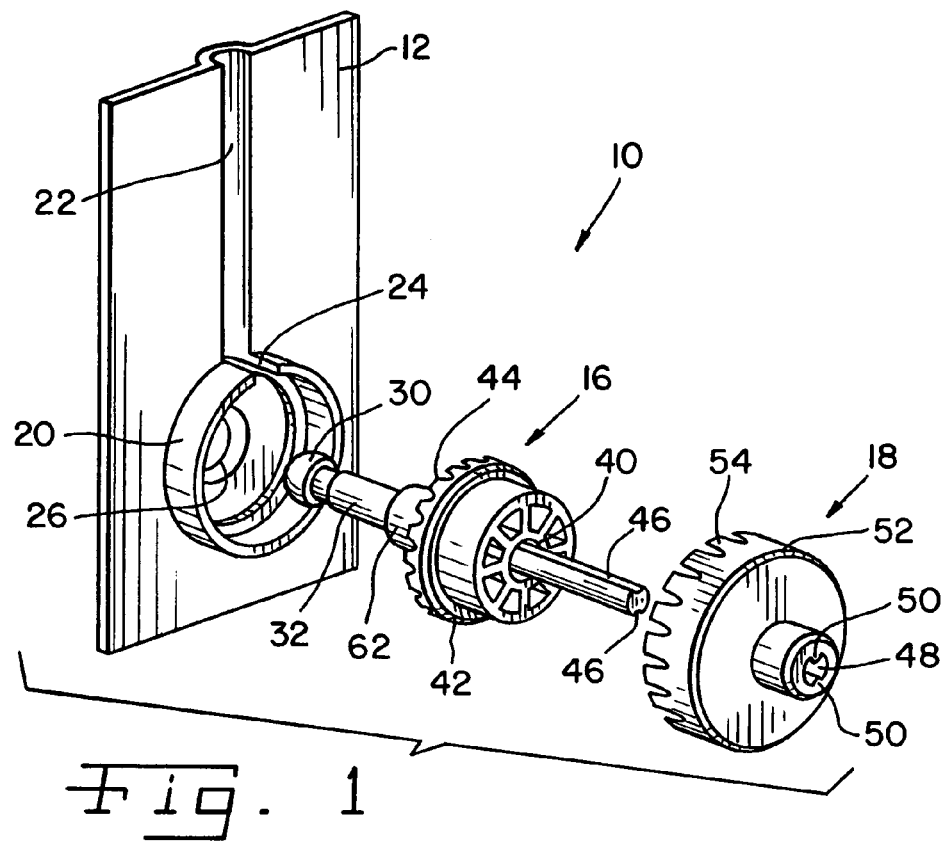
FIG. 1 is a perspective, exploded view of a headlamp adjuster in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now and more specifically to the drawings and to FIG. 1 in particular, numeral 10 designates a headlamp adjuster assembly in accordance with the present invention. Advantageously, headlamp adjuster 10 can be made of plastic or, alternatively, of other non-corrosive materials such as stainless steel or the like. As a further alternative, inexpensive metals also can be used for some or all of the components to be described hereinafter.

Headlamp adjuster 10 includes a base 12, a shaft 14, an adjustment gear 16 and a cap 18. Each is made of plastic or other inexpensive materials and are designed to fit together with one another for a simplified assembly and installation.

Base 12 is a fixed component defining an annular boss 20. A channel 22 is defined through base 12 and is aligned with a void 24 in boss 20. Channel 22 and void 24 define an access path for a tool used for adjusting headlamp adjustor 10 as will be described more fully hereinafter. Base 12 further defines a hole 26 for receiving shaft 14, hole 26 being substantially axially positioned within boss 20, such that boss 20 substantially surrounds hole 26.

Shaft 14 in the assembled adjustor 10 extends through hole 26, such that portions thereof are on opposites sides of base 12. A first end of shaft 14 includes a ball 30 to be received in a socket of a headlamp component for adjustment thereof. A threaded portion 32 is provided on shaft 14, threaded portion 32 being screw threads along at least a portion of the axial length of shaft 14.

Adjustment gear 16 is operatively disposed on shaft 14. Adjustment gear 16 defines an axial bore 40 therethrough, having internal threads to be received and engaged with threaded portion 32 of shaft 14. Alternatively, the internal threads can be formed when the threaded portion 32 of shaft 14 is driven into the bore 40. Adjustment gear 16 further includes a collar 42 having teeth 44 on a face thereof. Adjustment gear 16 is substantially received within boss 20 in the assembled headlamp adjustor 10.

Cap 18 is adapted to be received on shaft 14, substantially covering adjustment gear 16. Further, the structure and arrangement of cap 18 with respect to shaft 14 and boss 20 is provided so as to limit relative rotational movement between cap 18 and boss 20 and between cap 18 and shaft 14. Other suitable configurations are possible, so long as the cap 18 secures shaft 14 relative to base 12 such that shaft 14 does not rotate relative to base 12. To achieve the anti-rotation relationship, a portion of the axial length of shaft 14 includes longitudinal grooves 46 on the surface thereof. Cap 18 defines an axial opening 48 therethrough having tabs 50 therein to be received in axial grooves 46. In the exemplary embodiment of the invention, two diametrically opposed grooves 46 are provided on shaft 14 and two corresponding tabs 50 are provided in opening 50. It should be understood that one groove 46 and one tab 50, or more than two grooves 46 and tabs 50 also can be used. Further, other complementary geometric shapes of shaft 14 and opening 48 can be used to restrict relative rotation between shaft 14 and cap 18.

A peripheral skirt 52 of cap 18 includes slits 54 extending inwardly from an edge thereof so that a compression type fit can be made of cap 18 relative to boss 20. As illustrated, cap 18 surrounds boss 20, being clamped thereto by skirt 52 on the outside of boss 20. However, those skilled in the art will readily recognize that cap 18 also could be fitted on the inner diameter of boss 20 to limit relative rotational movement between cap 18 and boss 20 and between cap 18 and shaft 14. Similarly, other relative anti-rotation structural arrangements can be provided between shaft 14 and cap 18 and between cap 18 and boss 20 to limit relative rotational movement between shaft 14 and base 12.

To position shaft 14 relative to base 12, hole 26 of base 12 is provided with a plurality of inwardly extending fingers 60. Adjustment gear 16 is provided with a tapered nose 62 to be received in fingers 60. With nose 62 being of slightly larger diameter than the relaxed ID of fingers 60, insertion of gear 16 within boss 20 causes slight outward deflection of fingers 60 and thereby axially aligns shaft 14 relative to hole 26 of base 12.

In the exemplary embodiment shown in the drawings, the arrangement and configuration of the components is such that tools are not required for assembling adjustor 10. Adjustment gear 16 is slid onto shaft 14, and is rotated to engage threaded portion 32. Shaft 14 and adjustment gear 16 are positioned in boss 20, with shaft 14 extending through hole 26. Cap 18 is positioned to align tabs 50 with grooves 46, and is slid along shaft 14 until skirt 52 engages boss 20. Assembly is completed quickly and easily.

Figure 2:
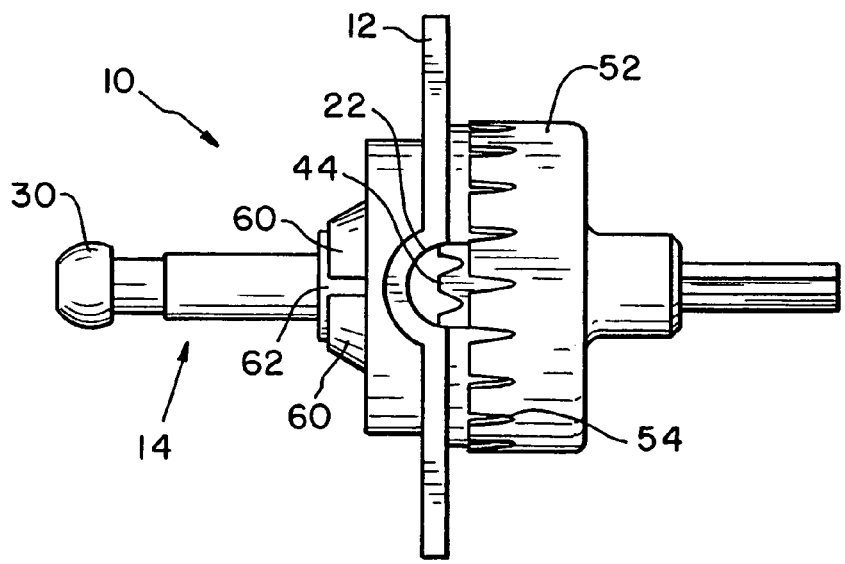
FIG. 2 is a plan view of an assembled headlamp adjuster of the type shown in FIG. 1.

As can be seen in the assembled view of FIG. 2, a portion of adjustment gear 16 is exposed through channel 22. Thus, a tool such as a screwdriver can be inserted through channel 22 to engage teeth 44 for rotating adjustment gear 16. Since adjustment gear 16 engages threaded portion 32 of shaft 14, with shaft 14 being non-rotatably disposed relative to base 12, rotation of adjustment gear 16 causes axial movement of shaft 14 inwardly or outwardly relative to base 12.

Figure 3:
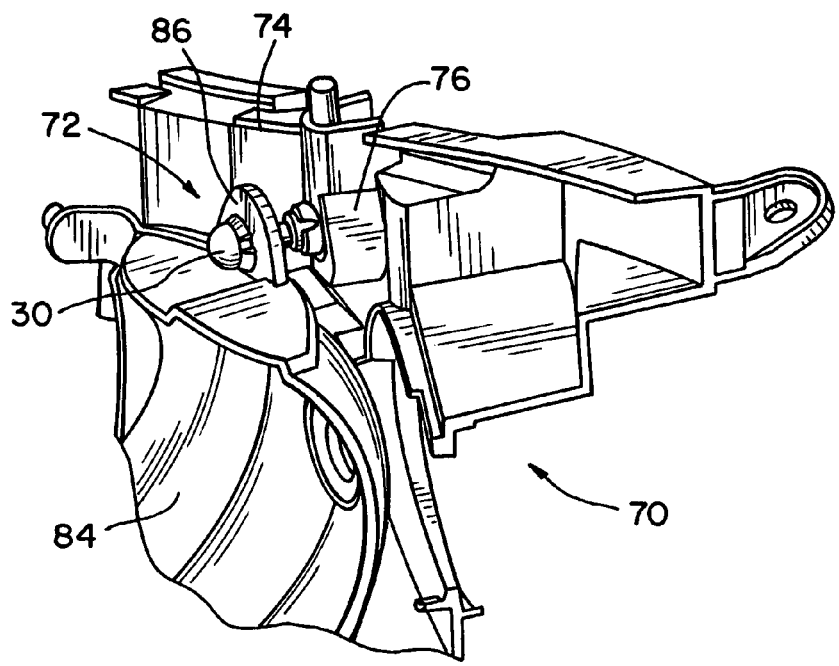
FIG. 3 is a perspective view of a second embodiment of a headlamp adjuster in accordance with the present invention.

Base 12 can be provided as a separate component secured in a headlamp assembly, or can be provided as an integral component of the headlamp housing. FIG. 3 illustrates a headlamp assembly 70 that includes a headlamp adjuster 72 that is partly formed as an integral part of a headlamp housing 74. In adjuster 72 a base 76 is provided as an integral portion of headlamp housing 74, and includes an annular boss 78 and a channel 80 aligned with a void 82 in boss 78. Base 76 and housing 74 can be provided as a monolithic structure of molded or cast plastic or the like. Providing base 76 as a part of housing 74 promotes consistency in location and facilitates installation by removing position and aligning requirements. With base 76 in a fixed position relative to housing 74, the remaining components of adjuster 72 need merely be attached thereto.

A headlamp reflector 84 is movably secured relative to housing 74. Housing 74 is in a substantially fixed position within an automobile or other structure in which headlamp adjuster 10 is used, and reflector 84 is movably secured therein. Reflector 84 defines a ball socket 86 for engaging ball 30 of shaft 14.

Figure 4:
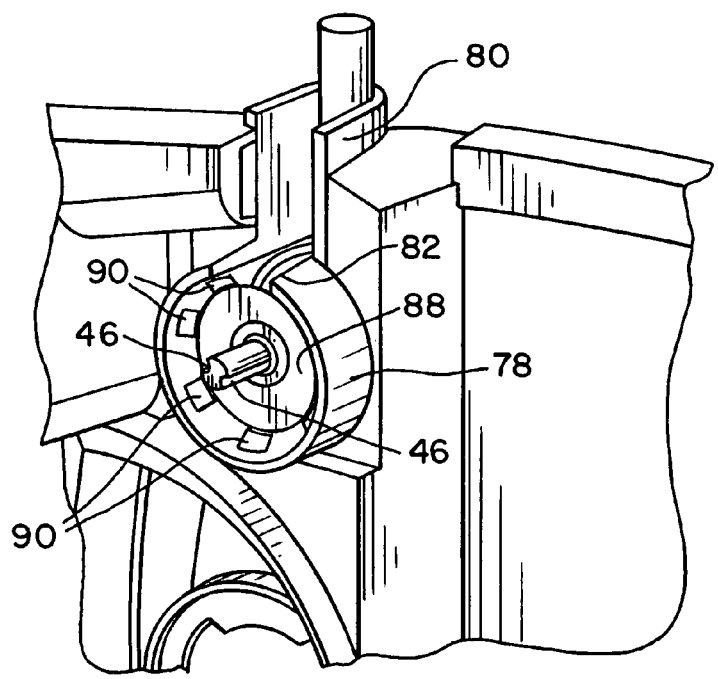
FIG. 4 is a perspective view of the headlamp adjuster shown in FIG. 3 taken from an angle different from that of FIG. 3.
Figure 5:
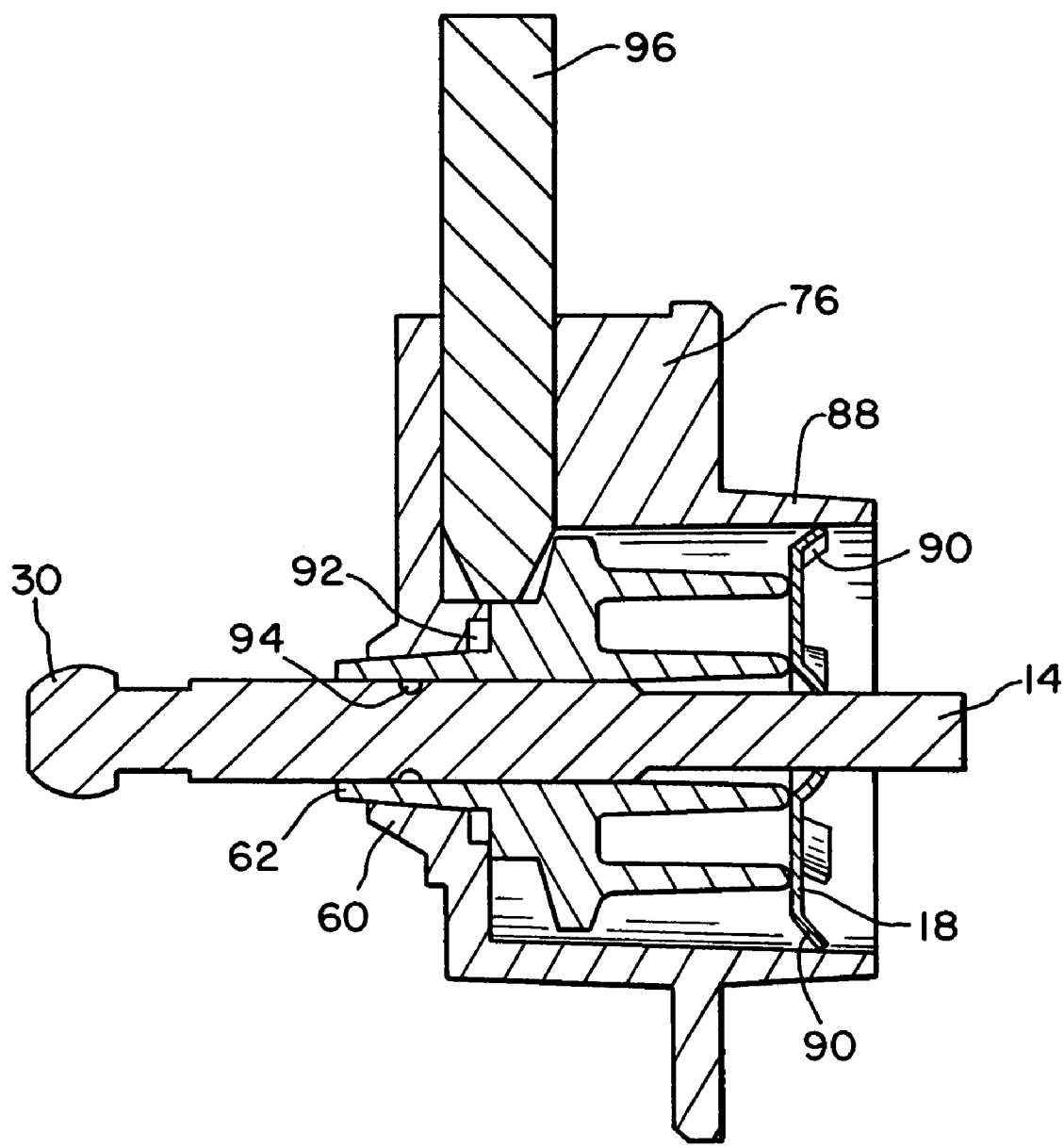
FIG. 5 is an enlarged cross-sectional view of the headlamp adjuster shown in FIGS. 3 and 4.

As illustrated in FIGS. 4 and 5, a modified cap 88 is provided for being secured within boss 78. Cap 88 includes a plurality of flanges 90 extending outwardly. Flanges 90 are angled slightly such that, as cap 18 is pressed into boss 78, flanges 90 deflect to create an interference fit of cap 88 within boss 78.

As illustrated in the cross-sectional view of FIG. 5, sealing of component parts can be effected through an O-ring 92 disposed on nose 62 of adjustment gear 16 and compressed against base 76. An O-ring also can be used to seal shaft 14 within nose 62. Alternatively, as illustrated in FIG. 5, the bore of nose 62 can be provided with an annular lip or ridge 94 of slightly smaller ID than the OD of shaft 14. Lip 94 thereby provides a seal against shaft 14.

FIG. 5 further illustrates the manner in which a rotary input tool 96, such as a Phillips head screwdriver is inserted through channels 22 or 80 to engage teeth 44 of gear 16. Rotation of tool 96 rotates gear 16, causing shaft 14 to move axially.

The present invention provides a headlamp adjuster that can be secured quickly and easily in a vehicle without the need for additional components or tools. In certain embodiments, a simple snap-fit or twisting action connection can be provided. The adjustment device can be made up of non-corrosive materials including plastic and can be manufactured and installed inexpensively.

If desired, the adjuster can be removed for servicing or replacement of headlamp components. Advantageously, a variety of different rotary input tools can be used in conjunction herewith.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An automobile headlamp adjuster, comprising
a fixed base having an annular boss;
a shaft extending through said base, said shaft having an end for engaging a headlamp reflector, a threaded portion and a non-threaded portion,
an adjustment gear disposed rotatably on said shaft and within said annular boss said adjustment gear defining an axial bore therethrough adapted for threaded engagement with said threaded portion of said shaft, whereby rotation of said gear causes axial movement of said shaft relative to said gear and said boss;
a cap secured to said boss and to said non-threaded portion of said shaft for preventing rotation of said shaft relative to said boss;
said annular boss having a void; said base defining a channel aligned with said void;
said gear having teeth exposed in said void; and said channel, said void and said gear configured to receive a may input device in driving engagement with said gear.

2. An automobile headlamp adjuster, comprising
a fixed base having an annular boss;
a shaft extending through said base, said shaft having an end for engaging a headlamp reflector, a threaded portion and a non-threaded portion;
an adjustment gear disposed rotatably on said shaft and within said annular boss, said adjustment gear defining an axial bore therethrough adapted for threaded engagement with said threaded portion of said shaft, whereby rotation of said gear causes axial movement of said shaft relative to said gear and said boss;
a cap secured to said boss and to said non-threaded portion of said shaft for preventing rotation of said shaft relative to said boss; and
said base having a hole therethrough, with a plurality of fingers extending into said hole, and said adjustment gear including a nose received between said fingers.

3. An automobile headlamp assembly, comprising:
a lamp housing defining therein a fixed ban and a substantially annular boss;
a shaft extending through said base, said shaft having an end for engaging a headlamp reflector movably retained in said lamp housing, said shaft having a threaded portion;
an adjustment gear disposed rotatably on said shaft and in said annular boss, said gear defining an axial bore therethrough adapted to threadedly engage said threaded portion of said shaft;
a cap having an opening therethrough receiving said shaft, said cap adapted to be secured non-rotatably to said shaft and to said boss; and
said lamp housing defining a channel aligned with a void in said boss and said gear having teeth exposed in said channel through said void in said boss.

4. An automobile headlamp assembly, comprising:
a lamp housing defining therein a fixed and substantially annular boss;
a shaft extending through said base, said shaft having an end for engaging a headlamp reflector movably retained in said lamp housing, said shaft having a threaded portion;
an adjustment gear disposed rotatably on said shaft and in said annular boss, said gear defining an axial bore therethrough adapted to threadedly engage said threaded portion of said shaft, said axial bore of said adjustment gear having a sealing lip engaged against said shaft;
a cap having an opening therethrough receiving said shaft, said cap adapted to be secured non-rotatably to said shaft and to said boss, wherein one of said shaft and said opening in said cap includes a drove, and the other of said shaft and said opening in said cap includes a tab adapted for mating engagement with said groove so as to prevent rotational movement of said shaft relative to said cap; and
said lamp housing including either a channel aligned with a void in said boss such that teeth on said gear are exposed in said channel through said void in said boss, or a hole surrounded by said boss and having fingers extending inwardly therein such that a nose of said adjustment gear is received in said fingers.

5. An automobile headlamp assembly, comprising:

a lamp housing defining therein a fixed base and a substantially annular boss;

a shaft extending through said base, said shaft having an end for engaging a headlamp reflector movably retained in said lamp housing said shaft having a threaded portion;

an adjustment gear disposed rotatably on said shaft and in said annular boss, said gear defining an axial bore therethrough adapted to threadedly engage said threaded portion of said shaft;

a cap having an opening therethrough receiving said shaft, said cap adapted to be secured non-rotatably to said shaft and to said boss; and said lamp housing defining a hole surrounded by said boss, said hole having fingers extending inwardly therein, and said adjustment gear having a nose received in said fingers.

* * * * *